United States Patent [19]

Shimizu et al.

[11] 4,318,100
[45] Mar. 2, 1982

[54] AUTOMATIC GROUND CLUTTER REJECTION IN WEATHER PULSE RADAR SYSTEM

[75] Inventors: Toshio Shimizu; Atsushi Wakabayashi; Shuichi Goto, all of Mitaka, Japan

[73] Assignee: Japan Radio Company, Limited, Tokyo, Japan

[21] Appl. No.: 122,498

[22] Filed: Feb. 19, 1980

[30] Foreign Application Priority Data

Feb. 20, 1979 [JP] Japan .................................. 54-18876

[51] Int. Cl.³ .............................................. G01S 13/95
[52] U.S. Cl. ................................................... 343/5 W
[58] Field of Search ....................................... 343/5 W

[56] References Cited

U.S. PATENT DOCUMENTS

| | | | |
|---|---|---|---|
| 2,736,020 | 2/1956 | Atlas | 343/5 W X |
| 2,859,437 | 11/1958 | Atlas | 343/5 W |
| 2,911,640 | 11/1959 | Atlas | 343/5 W X |
| 2,994,079 | 7/1961 | Obloy et al. | 343/5 W X |
| 4,139,847 | 2/1979 | Shimizu et al. | 343/5 W |

*Primary Examiner*—Malcolm F. Hubler
*Attorney, Agent, or Firm*—Frishauf, Holtz, Goodman and Woodward

[57] ABSTRACT

In a weather radar system wherein echo signals are linear-detected from the waves received at the radar, each one of echo signals being compared with the later one to derive AC component, and the mean power of the weather echo estimated from the power of the AC component, the linear-detected echo signals are amplitude suppressed before compared. The amplitude suppression effectively removes the errors due to the fluctuation of ground clutter, and the variation of AC power of weather echo due to the existence of ground clutter. An amplitude suppressor is used which has an amplitude suppressing property expressed by $Y=X^k$, where X is an amplitude of the input signal, Y is an amplitude of the output signal, and k is a constant ($0<k<1$). The value of k is advantageously 0.3–0.9, and, more advantageously 0.6–0.7. If the echo signals are obtained in a form of a logarithmic signal, an amplitude suppressor which has an input-output characteristic expressed by, for example, $Y=10^{kZ/20}$ (Z: amplitude of input signal, Y: amplitude of output signal) can be used.

13 Claims, 7 Drawing Figures

AUTOMATIC GROUND CLUTTER REJECTION IN WEATHER PULSE RADAR SYSTEM

BACKGROUND OF THE INVENTION

This invention relates to weather radar systems for obtaining rain information by radiating microwave pulses from a radar transmitter and receiving echo signals from weather targets at a radar receiver, and, in particular, to rejection of echo signals from fixed targets such as the ground (which are hereinafter referred to as "ground clutter") included in the received signals.

In weather radar systems, microwave pulses are radiated with a certain repetition frequency from the transmitter and echo signals from weather targets are obtained from the waves received in the receiver by envelope-detection of the received waves. The echo signals are averaged over a number of pulses to obtain the average intensity of the weather echo and applied to an indicator such as a plan position indicator (PPI), an A-scope indicator and others to display the geometric pattern and motion of weather targets such as rain, clouds, storms and so on. Since the amplitude of the averaged signal corresponds to the average intensity of the weather echo which depends on, for example, the rain amount, the rain amount at a certain distance from the radar can be seen from the brightness of the pattern on the indicator.

One of the difficult problems in weather radar systems is rejection of ground clutter. The reflected wave received at the radar receiver includes echoes from fixed objects such as mountains, buildings and other objects on the ground (this echo is referred to as "ground clutter"), besides weather echoes. The ground clutter intrudes in echo signals of the weather target to make it difficult to obtain the weather pattern and other information from the echo signals.

Shimizu and Goto, two of the inventors of this invention already proposed an automatic ground lutter rejection system in U.S. Pat. No. 4,139,847. According to the method proposed in the U.S. patent, the received wave in the weather radar receiver is linear-detected and each one of successive pulses obtained by the linear-detection is compared with another later one which is spaced apart from each echo signal by a time period that the fluctuation of weather echo signals is independent to provide difference signals as signals corresponding to fluctuation of the weather target. The variance of the difference signal is proportional to the mean power of the weather echo. Therefore, the difference signals give signals corresponding to the average intensity of the weather echo wherein the ground clutter is effectively eliminated. The difference signals are unipolarized, or squared, and thereafter, are averaged. The averaged signals have an amplitude corresponding to the average intensity of the weather echo. Therefore, the display of the weather pattern, the observation of the rain amount and other analysis can be readily and accurately made by employing the averaged signals in the known technique and devices.

The ground clutter rejection proposed in the aforesaid U.S. patent is based on a provision that the intensity of the ground clutter is constant over the time period between two compared echo signals. But, the intensity of the ground clutter actually varies because, for example, the dielectric constant of fixed targets such as mountains varies and because trees move. Therefore, the difference signals from the comparing circuit includes not only the signals corresponding to the fluctuation of the weather target but also the signals corresponding to the fluctuation of the ground clutter. This means that the average intensity of the weather echo is erroneously observed greater. In the range having greater ground clutter, the weather observation is actually difficult using the weather radar system.

SUMMARY OF THE INVENTION

An object of this invention is to provide an improved method and device for rejecting ground clutter included in the echo signals obtained by the weather radar.

Another object of this invention is to provide a weather radar system wherein any ground clutter is automatically rejected efficiently even if the amplitude of the ground clutter fluctuates.

Still another object of this invention is to provide a method and device for rejecting ground clutter by suppressing the amplitude of echo signal included in the wave received in the radar receiver.

Yet another object of this invention is to achieve the above objects with simple steps and simple circuit formations.

According to this invention, the echo signals included in the received wave at the radar receiver are derived as amplitude suppressed signals as the greater amplitude is more suppressed. The derived amplitude suppressed signals are applied to a comparator and are processed similar to the method and device in the above described U.S. patent.

Providing that the amplitude of the echo signal is X, the amplitude Y of the amplitude suppressed echo signals which are applied to the comparator is expressed by $Y = X^k$, wherein k is a suppressing constant and $0 < k < 1$. Advantageously, k is 0.3 or more but 0.9 or less, and more advantageously 0.6 or more but 0.7 or less.

The ground clutter component in the echo signal is suppressed so that the residual ground clutter is reduced even if ground clutter fluctuates. The weather echo signal is also suppressed by the amplitude suppression to cause a negative error of the weather echo intensity, but the residual ground clutter balancing the negative error, so that the accurate weather information can be obtained.

Further objects, features and other aspects of this invention will be understood from the detailed description of the preferred embodiments of this invention referring to the annexed drawings.

DETAILED DESCRIPTION OF PREFERRED EMBODIMENTS

Before describing embodiments of this invention, the automatic ground clutter rejection system proposed in the above described U.S. Patent will be briefly described.

Figure 1:
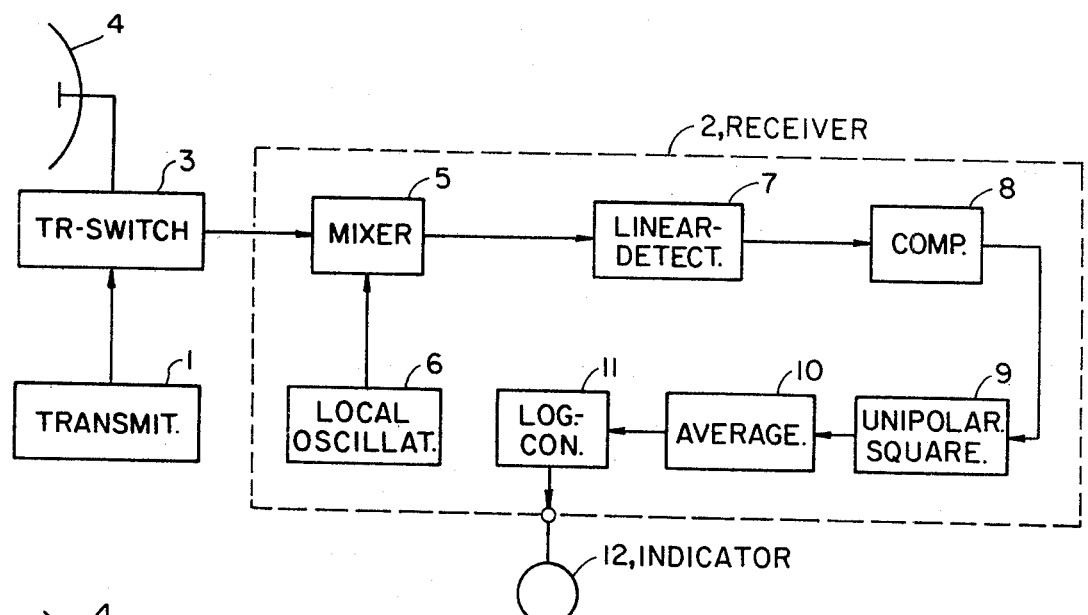
FIG. 1 is a block diagram of a known weather radar system.

Referring to FIG. 1, the weather radar system comprises a pulse transmitter 1, a receiver 2, a TR (transmitter-receiver) switch 3 and antenna 4. The receiver 2 comprises a mixer 5, a local oscillator 6, a linear-detection circuit 7, an amplitude comparator 8, a unipolarizer (or a square law device) 9, an averager 10 and a logarithmic converter 11.

For deriving the AC component of the weather echo from the linear-detection output, comparator 8 is coupled to the output of linear-detection circuit 7, to compare each one of successive echo signals with another later one which is spaced apart from the each one echo signal by a time period that the fluctuation of weather echo signal is independent. As comparator 8, known circuits such as canceller circuit in the envelope-processing MTI system can be employed.

In comparator 8, the ground clutter and the DC component of the weather echo are eliminated and the AC component of the weather echo is derived. The derived AC component is unipolarized in unipolarizer 9 such as a full-wave rectifier circuit. The average amplitude of the output signal of unipolarizer 9 corresponds to an effective amplitude of the AC component of the weather echo.

Averager 10 is for averaging amplitudes of the successive unipolarized signals to obtain the effective amplitude of the AC component of the weather echo. A low-pass filter and/or video integrator is used for averager 10. The amplitude of the averaged signal provides the mean power of the weather echo.

A square law device can be used in place of the unipolarizer.

The output of averager 10 is logarithmic converted at converter 11 and is applied to an indicator 12 having a dB scale. Thus, the rain amount is displayed on indicator 12. But, if the amplitude of the ground clutter fluctuates, the residual ground clutter presents in the output from comparator 8. Thus, the rain amount is erroneously displayed more than the actual amount.

This invention aims to remove such an error.

This invention contemplates to reject the residual ground clutter by non-linearly suppressing the amplitude of the detected echo signal before the comparison so that the greater amplitude is more suppressed.

Figure 2:
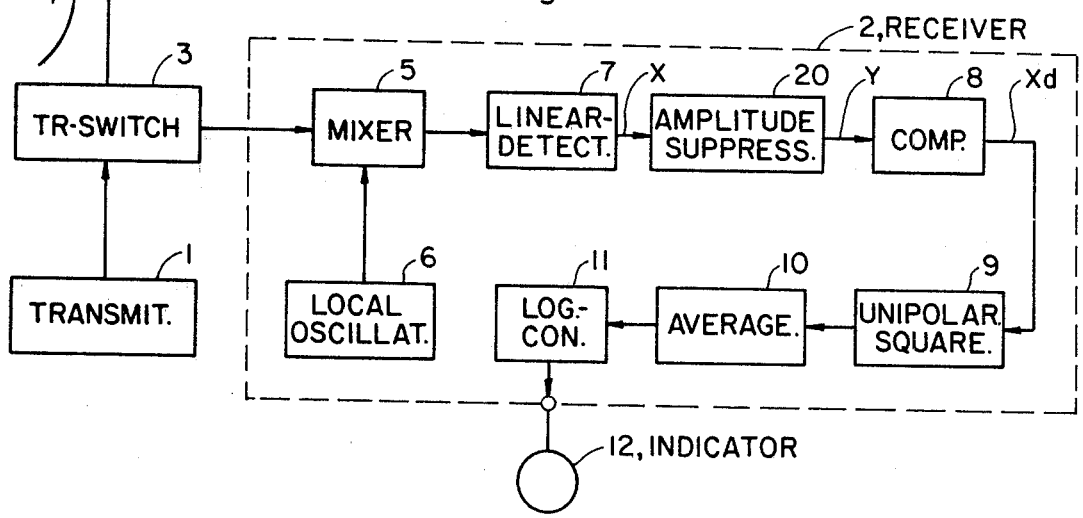
FIG. 2 is a block diagram of an embodiment of this invention.

A weather radar system according to an embodiment of this invention shown in FIG. 2 is similar to the known system shown in FIG. 1, except for an amplitude-suppressor 20 connected between linear-detector 7 and comparator 8. The similar circuit blocks are represented by the same reference numerals as in FIG. 1.

Amplitude-suppressor 20 is a circuit for suppressing the amplitude of the input signal so that the greater amplitude is more suppressed. Now, providing that the amplitude of the input signal is represented by X, the amplitude Y of the output signal is expressed by, for example, the following equation:

$$Y = X^k \quad (1)$$

wherein, k is a suppressing constant and $0 < k < 1$.

Figure 3:
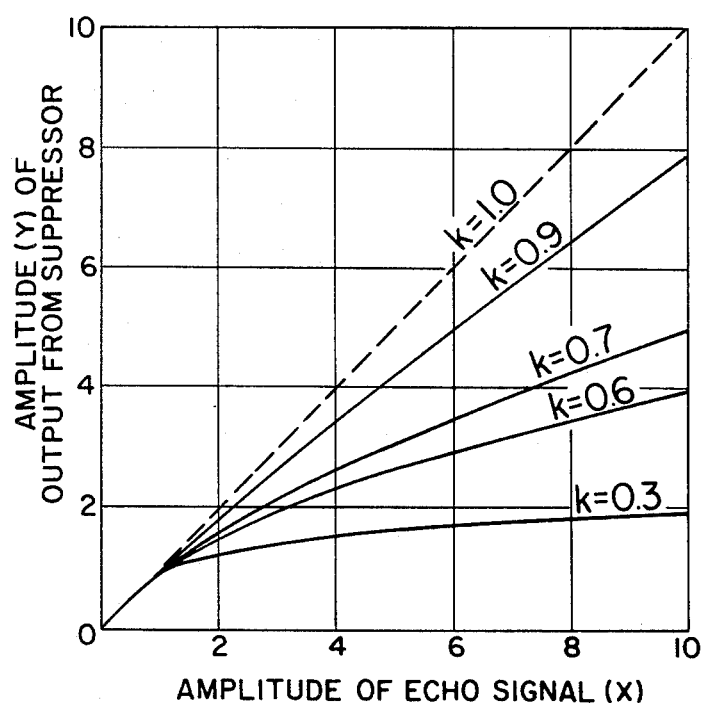
FIG. 3 is a graphical view illustrating the input and output amplitude response of the amplitude suppressor used in the embodiment.

The relationship between the input amplitude X and the output amplitude Y is shown in FIG. 3, with respect to several values of k. In FIG. 3, a dotted line shows a case where no amplitude-suppression is performed, or $k = 1$.

In case that k is selected to be 0.7, and providing that the maximum ground clutter included in the echo signal from linear-detector 7 is greater by 180 times (45dB) than the receiver noise, the intensity of the ground clutter applied to comparator 8 through amplitude suppressor 20 is weakened to the value of 37 times (31 dB = 45 × 0.7) of the receiver noise. And the ground clutter is further removed through comparator 8, unipolarizer 9 and averager 10. Providing that the total ground clutter rejection ratio in these three circuits is 1/30, the residual ground clutter in the output from averager 10 is 1.2 times ($= 37 \div 30$) the receiver noise. This is compared with the known device of FIG. 1 using no amplitude suppression, wherein the residual ground clutter is 6 times ($180 \div 30$). It is clearly understood that the ground clutter is sufficiently rejected by the amplitude suppression of the echo signal.

Although the amplitude suppression of echo signal decreases the residual ground clutter, the weather echo signal is amplitude suppressed at a time. Therefore, the intensity of the weather echo is estimated smaller than the actual intensity, or with a negative error. While the output from the averager includes the residual ground clutter as above described, which is a positive error of the estimated intensity of the weather echo. Accordingly, the output of averager 10 gives an accurate intensity of weather echo, because the negative error and the positive error are cancelled by one another.

On the other hand, it is assumed, in the U.S. Pat. No. 4,139,847, that the ratio of the AC power $(\sigma_v^2)$ and the mean power $(\overline{x^2})$ of the weather echo is approximately constant. According to the assumption, in the known device in FIG. 1, the linear detected echo signals are processed by comparator 8, unipolarizer 9 and averager 10, to obtain AC power $(\sigma_v^2)$ from the output of the averager 10. The mean power $(\overline{x^2})$ is estimated from the AC power $(\sigma_v^2)$.

But, assuming that the ground clutter does not fluctuate, the ratio of the AC power $(\sigma_v^2)$ and the mean power $(\overline{x^2})$ of the weather echo varies in response to the variation of the ratio of the mean power $(\overline{x^2})$ and the mean power (P) of the ground clutter, as noted from equations (4) and (13) and FIG. 1 of the above described U.S. patent. That is, it will be understood that the AC power $(\sigma_v^2)$ of the weather echo is increased by the existence of the ground clutter.

Therefore, if the known device in FIG. 1 is arranged so that the output from averager 10 gives the mean power $(\overline{x^2})$ of the weather echo when ground clutter does not exist, the mean power $(\overline{x^2})$ obtained from the output of averager 10 is erroneously estimated greater than the actual mean power of the weather echo, at a time when ground clutter exists.

The method according to the U.S. patent includes a positive error even if the ground clutter does not fluctuate.

The positive error is also suppressed in the invention. That is, the linear detected echo signal is amplitude-suppressed and, thereafter, is applied to comparator 8. Therefore, the value of the AC power $(\sigma_v^2)$ obtained from averager 10 is smaller than the power of AC component in the linear detected echo signal. It will be noted that the mean power $(\overline{x^2})$ estimated from the AC power $(\sigma_v^2)$ more approximates to the actual mean power of the weather echo. That is, the positive error is also suppressed.

Figure 4:
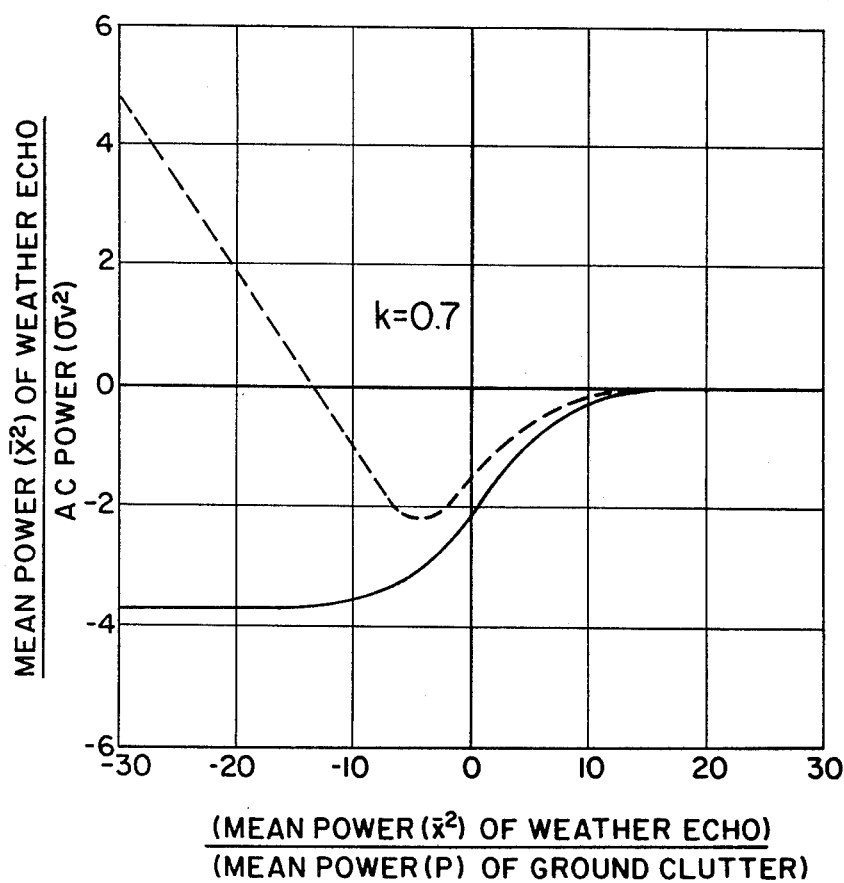
FIG. 4 graphically shows the relation between ratio of the AC power ($\sigma_v^2$) and the mean power ($\overline{x^2}$) of the weather echo and the ratio of the mean power ($\overline{x^2}$) of the weather echo and the mean power (P) of the ground clutter.

FIG. 4 illustrates the relation between the ratio of the AC power $(\sigma_v^2)$ and the mean power $(\overline{x^2})$ of the weather echo and the ratio of the mean power $(\overline{x^2})$ and the mean power (P) of the ground clutter. It is assumed that the ground clutter does not fluctuate.

A solid line shows the relation disclosed in the U.S. patent, and a dotted line shows the relation as to the amplitude-suppressed signal (according to the equation (1) but k=0.7).

It should be noted that the value of $\overline{x^2}/\sigma_v^2$ at a time when no ground clutter exists is selected to be zero (dB) in FIG. 4.

As above described, the known device in FIG. 1 is accompanied with errors based on the two assumptions, that is, one is that the ground clutter does not fluctuate and the other is that the ratio of the AC power $(\sigma_v^2)$ and the mean power $(\overline{x^2})$ of the weather echo is constant.

Figure 5:
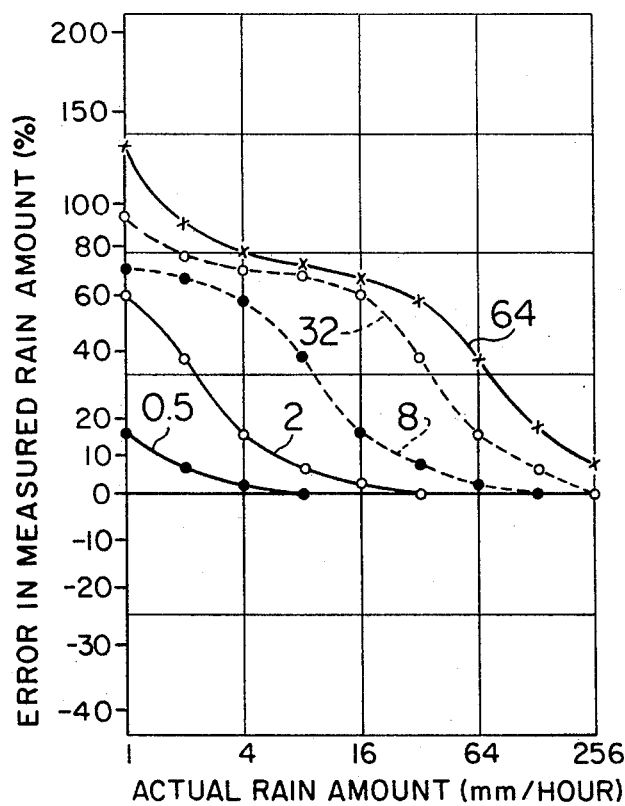
FIG. 5 graphically shows errors in rain amount measured by the known system in FIG. 1 under various intensities of ground clutters.

FIG. 5 shows the relation between error (%) in rain amount measured by the known device in FIG. 1 and the actual rain amount. Seven curves are corresponding to the cases of different intensity of ground clutter. The numeral accompanying each line represents the intensity of the ground clutter as a valve of rain amount having the intensity equal to the ground clutter.

According to the known method in the U.S. Pat. No. 4,139,847, it is understood from FIG. 5 that the error in measured rain amount is +130% at maximum.

But the errors based on the two assumptions are suppressed in this invention so that the measuring of rain amount can be performed with an improved accuracy.

Figure 6:
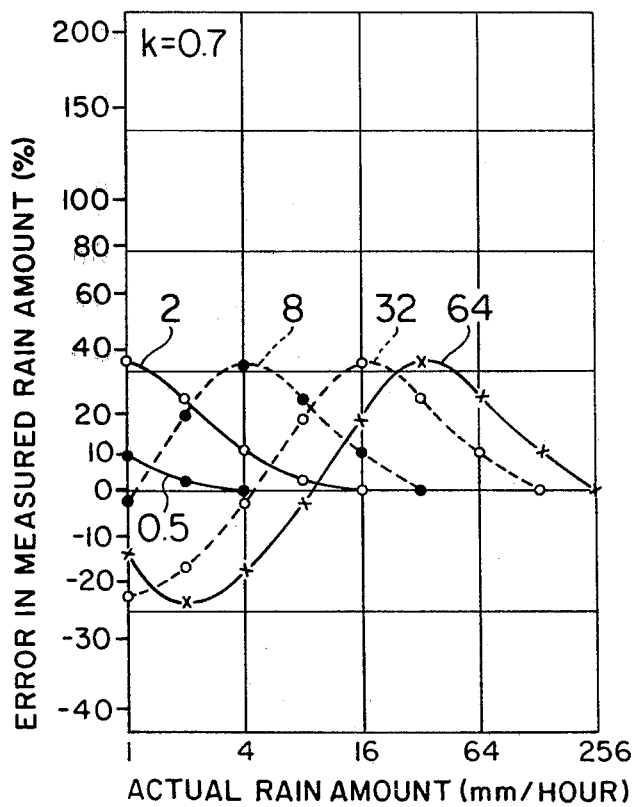
FIG. 6 graphically shows errors in rain amount measured by the system in FIG. 2.

FIG. 6 shows the relation between error (%) in rain amount measured by the embodiment of FIG. 2 and the actual rain amount, similar to FIG. 5.

It will be noted from FIG. 6 that the maximum error is +35%. Compared with the error in the known device, the error in measured rain amount of this invention is improved remarkably.

The error suppressing effect varies in response to the selected value of the amplitude-suppressing constant k.

Taking the fluctuation of the ground clutter, the change of the AC power of the weather echo due to the existence of ground clutter, the positive error due to the residual ground clutter and the negative error due to the amplitude-suppression of the weather echo into consideration, the constant k is advantageously selected to be 0.3–0.9, or more advantageously, 0.6–0.7.

In the embodiment of FIG. 2, linear-detector 7 is used for obtaining the echo signals from the received wave, and the output of the linear-detector is applied to amplitude suppressor 20. But various detectors can be used for obtaining the echo signals from the received wave. According to the used detector, an amplitude suppressor is so selected that the greater amplitude of the detected signal is more suppressed.

Figure 7:
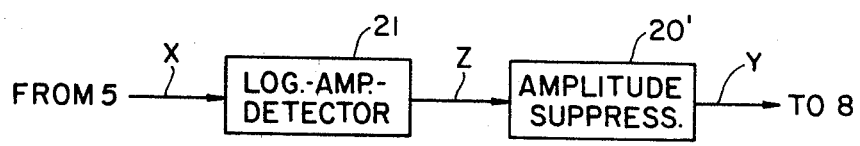
FIG. 7 is a block diagram of a modification of the embodiment of this invention.

Referring to FIG. 7, a logarithmic amplifying detector 21 is used for the detector. The detector detects the envelope signal and outputs the signal having a log-converted amplitude. Therefore, the relationship between the amplitude X of the envelope of the input signal and the amplitude Z of the output signal is given by the following equation:

$$Z = 20 \log X \text{ (dB)} \quad (2)$$

An amplitude suppressor 20' is selected to have a relationship between the amplitudes of input and output signals as given by the following equation:

$$Y = 10^{kZ/20} \quad (3)$$

where, k is an amplitude suppressing constant and $0 < k < 1$. From equations (2) and (3), $$Y = 10^{k \log X} = X^k \quad (4)$$

Namely, this equation (4) is the same as the equation (1). Therefore, a signal which is an amplitude-suppressed echo signal as shown in FIG. 3 is obtained on the output of amplitude-suppressor 20'. The output of amplitude-suppressor 20' is applied to comparator 8 similar to the embodiment of FIG. 2, and a similar process is performed.

The amplitude suppressor which is used in the above embodiments can be readily designated by the combination of logarithmic diode circuits and operational amplifiers. A read only memory (ROM) can be used as the amplitude suppressor. In that case, the amplitude suppressing function, or equation (1) or (3), is stored in the ROM.

It will be noted that, if a detector having a non-linear property is used, the use of the amplitude suppressor can be omitted.

What is claimed is:

1. In a method for obtaining rain information from the mean power of the weather echo signal in a weather pulse radar system, which comprises steps of obtaining echo signals by detection of received waves in the radar system, comparing each one of successive echo signals with another later one which is spaced apart from the each one echo signal by a time period that the fluctuation of weather echo signals is independent to generate amplitude-difference signals, measuring the variance of the amplitude-difference signals, and calculating the mean power of the weather echo signal from the variance, the improvement comprising non-linearly amplitude suppressing the echo signals before the comparing step to more suppress echo signals of the greater amplitude, whereby the residual ground clutter in the amplitude-difference signals may be reduced.

2. In a method for rejecting ground clutter from echo signals in a weather pulse radar system which comprises steps of linear-detecting the received wave in the radar system to obtain spaced detected pulse signals, and comparing each two detected pulse signals which are spaced apart from one another by a time period that the fluctuation of weather echo signals is independent to generate an amplitude-difference signals to eliminate the DC component of the echo signal thereby to obtain signals corresponding to the mean power of the weather echo, the improvement comprising non-linearly amplitude suppressing the echo signals before the comparing step to more suppress echo signals of the greater amplitude, whereby the residual ground clutter in the amplitude-difference signals may be reduced.

3. The method as claimed in claim 1 or 2, wherein the echo signals are non-linearly amplitude suppressed so that the amplitude Y of the suppressed signal may be expressed by the equation $Y = X^k$, X being the amplitude of the echo signal to be suppressed, and k being less than 1 but greater than 0.

4. The method as claimed in claim 3, wherein k is 0.3 or more but 0.9 or less.

5. The method as claimed in claim 3, wherein k is 0.6 or more but 0.7 or less.

6. In a weather radar system comprising a pulse radar transmitter and receiver device for detecting a weather echo and obtaining rain information from the mean power of the weather echo signals, the improvement comprising:

means for non-linearly deriving echo signals including weather echo signals and/or ground clutter from the wave received at the radar receiver device, as signals that the greater amplitude of the echo signal components in the received waves is more suppressed;

means coupled to said deriving means for comparing each one of successive echo signals from said deriving means with another later echo signal which is spaced apart from said echo signal by a given time period that fluctuation of weather echo signals is independent to generate an amplitude-difference signal;

means coupled to said comparing means for unipolarizing the amplitude-difference signals; and means coupled to said unipolarizing means for averaging the successive output signals therefrom to provide averaged signals having an amplitude corresponding to the mean power of the weather echo.

7. The improvement as claimed in claim 6, wherein means for squaring the amplitude-difference signals are used in place of said unipolarizing means.

8. The improvement as claimed in claim 6 or 7, wherein said deriving means comprises a linear-detector for linear-detecting the received wave, and an amplitude suppressor having an input and output amplitude response which is given by $Y=X^k$, X being an amplitude of the input signal, Y being an amplitude of the output signal and k being an amplitude suppressing and $0<k<1$.

9. The improvement as claimed in claim 8, wherein k is 0.3 or more but 0.9 or less.

10. The improvement as claimed in claim 8, wherein k is 0.6 or more but 0.7 or less.

11. The improvement as claimed in claim 6 or 7, wherein said deriving means comprises a logarithmic amplifying detector having an input and output amplitude response of $Z=20 \log X$, and an amplitude suppressor having an input and output amplitude response of $Y=10^{kZ/20}$, where X is an amplitude of the echo signal included in the received wave, Y being an amplitude of the output of said amplitude suppressor, Z being an amplitude of the output of said logarithmic amplifying detector, and k being an amplitude suppressor and $0<k<1$.

12. The improvement as claimed in claim 11, wherein k is 0.3 or more but 0.9 or less.

13. The improvement as claimed in claim 11, wherein k is 0.6 or more but 0.7 or less.

* * * * *